Figure 2:
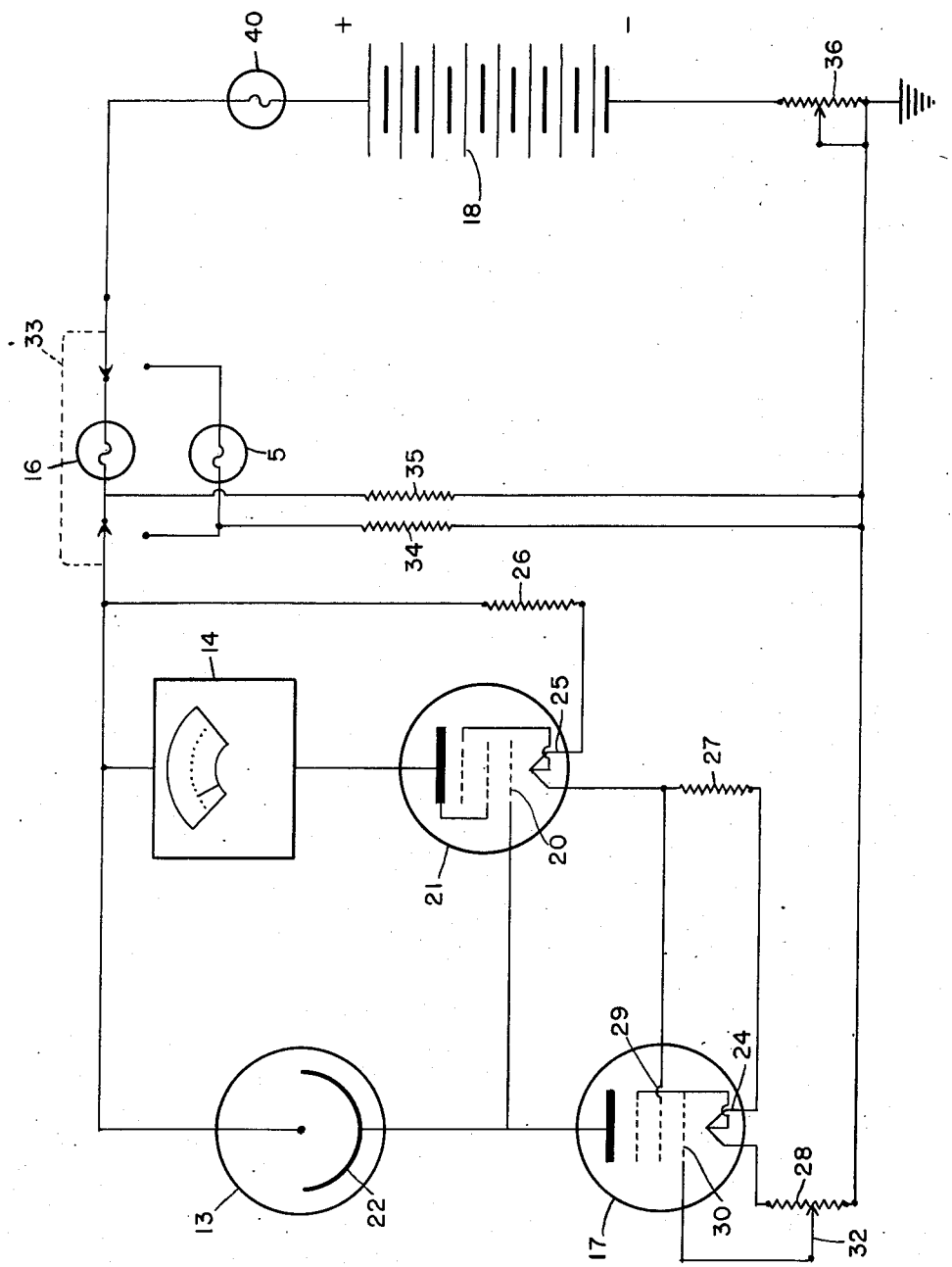

Sept. 16, 1952     E. L. ROWLAND, JR     2,610,541
BLOOD TESTING APPARATUS
Filed Jan. 5, 1948                                    3 Sheets-Sheet 1
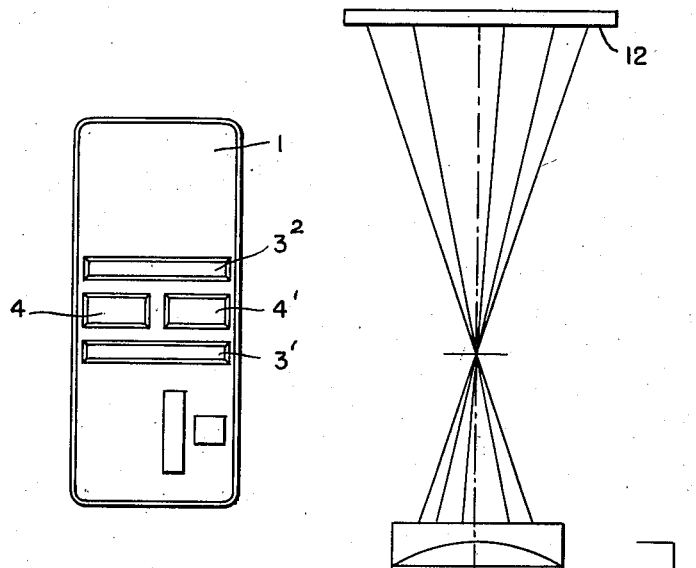
FIG. 3.           FIG. 4.
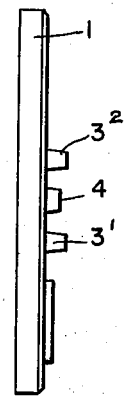
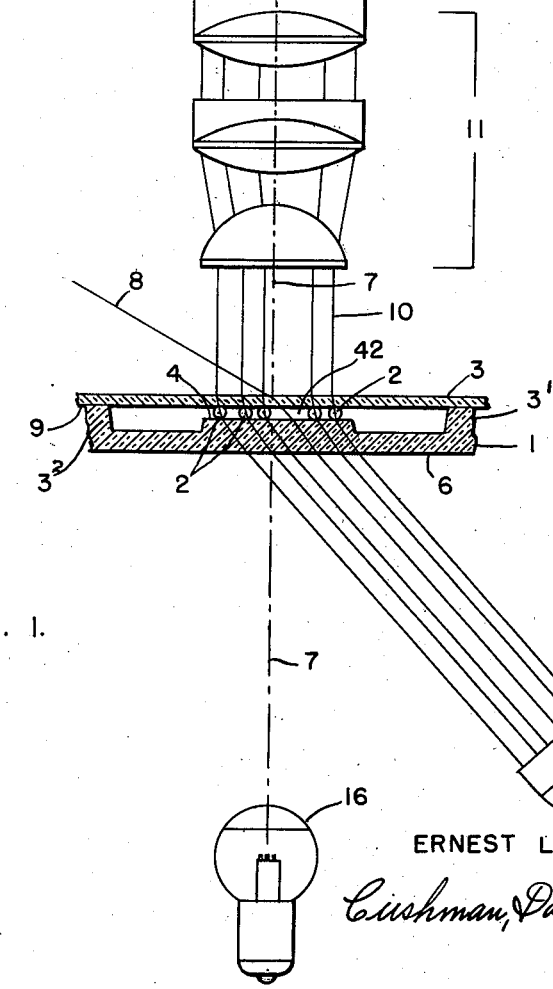
FIG. 1.
Inventor
ERNEST L. ROWLAND, JR.
Cushman, Darby & Cushman
Attorneys Sept. 16, 1952     E. L. ROWLAND, JR     2,610,541
BLOOD TESTING APPARATUS Filed Jan. 5, 1948     3 Sheets-Sheet 2

Inventor
ERNEST L. ROWLAND, JR.

Cushman, Darby & Cushman
Attorneys

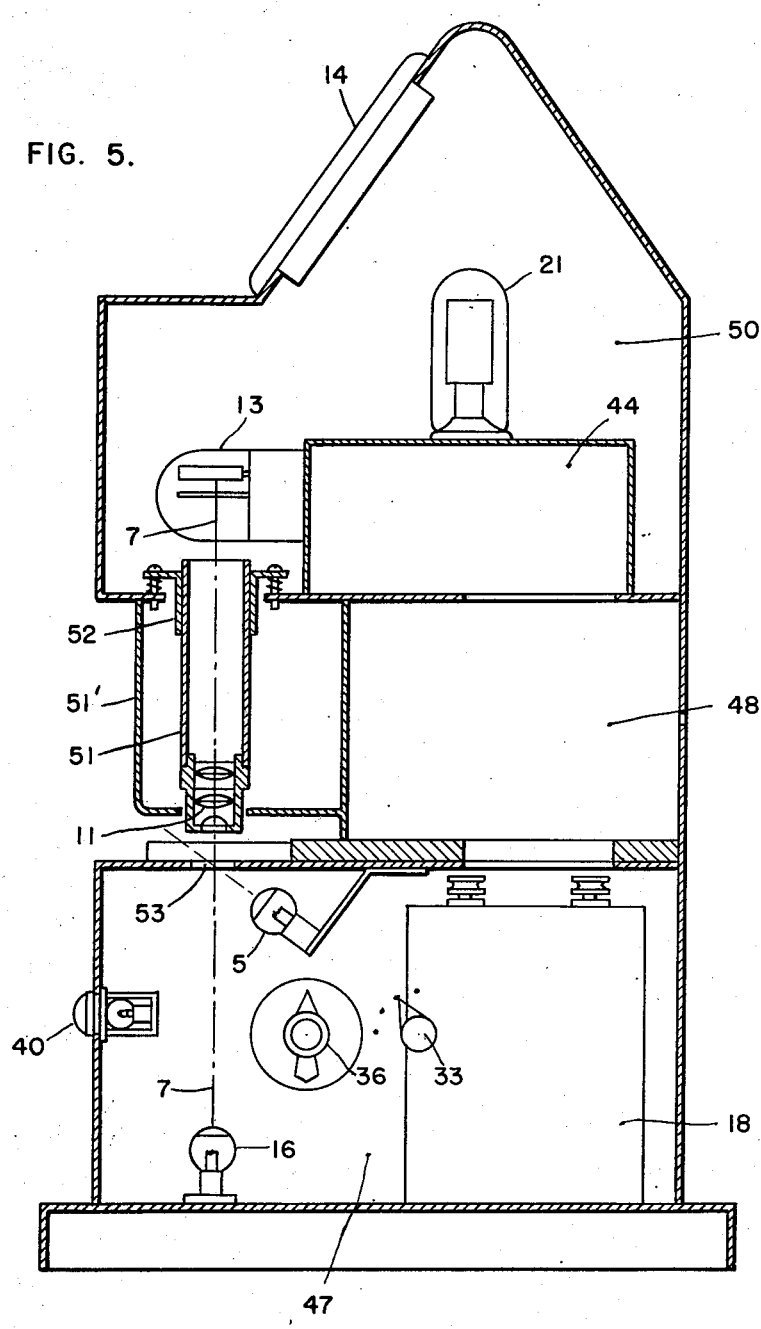

Patented Sept. 16, 1952

2,610,541

UNITED STATES PATENT OFFICE 2,610,541

BLOOD TESTING APPARATUS

Ernest Lee Rowland, Jr., Jacksonville, Fla.

Application January 5, 1948, Serial No. 531

2 Claims. (Cl. 88—14)

This invention relates to an apparatus for making a quick accurate blood analysis of the number of red blood cells, white blood cells and the hemoglobin percentage.

One of the functions of a medical laboratory is the analysis of blood during the course of which it is necessary to determine the number of white and red cells. The laboratory technician in performing the task places a dilute solution of blood on a ruled slide and makes a physical count of the cells by means of a microscope. It is the object of the invention to eliminate the tediousness and human error inherent in the above method by the provision of a simple inexpensive easily operated apparatus that will automatically give an indication of the number of cells.

Another object of this invention is to provide an automatic means for indicating the amount of hemoglobin in a blood specimen without the use of special "standard" solutions or "blanks."

Another object of this invention is to provide an apparatus for counting the number of white blood cells and determining the hemoglobin percentage from the same blood specimen.

A further object is to provide an instrument whereby both white and red blood counts can be accurately and quickly determined automatically without tedious visual counting.

Reference to the drawings:

Figure 1 shows a diagrammatic view of the light rays as they pass through the optical system of this invention, Figure 2 shows the electrical circuits used in this invention, Figure 3 is a top view of a specimen slide, Figure 4 is a side view of the specimen slide, and Figure 5 shows a general arrangement of the apparatus of the invention.

It is a well known principle of physics that light travels faster through air than through denser media and that consequently as it passes from one medium into another medium of greater density, it is bent toward the normal to the boundary and vice versa. This will be so if the angle of incidence, i. e., the angle between the normal to the boundary and the light ray is greater than zero but less than the critical angle, i. e., the angle of incidence at which all the light rays are reflected. Accordingly, if blood cells are suspended on a slide in a solution of less density than themselves, light entering the cells at a proper angle will be bent substantially parallel to the normal to the slide and light entering the area between the cells will be refracted by a lesser angle.

In order to understand how the apparatus of this invention incorporates the physical principles described above, reference is made to Figure 1, which represents a side view of the slide 1 shown in Figures 3 and 4, and 2 represents the blood cells suspended by capillary action between the glass cover 3 that rides on ridges 3' and 3² as shown in Figure 3, and the polished surfaces 4 and 4'. Substantially parallel rays of light from light source 5 on entering the bottom surface 6 of the slide are bent toward the normal axis 7 and fall on surface 4 or 4', depending on the position of the slide. Those rays such as 8 that encounter the solution alone are refracted away from the normal at an angle somewhat less than the angle of incidence to surface 6 as the solution is denser than air, and pass through the solution at that angle. At the boundary 9 between the blood specimen and the cover 3 they are again bent toward the axis and on emerging from the cover into the air, they are bent away from the axis. The angle of incidence of the rays from light source 5 is so chosen that a ray 10 that encounters a blood cell on its way through the solution is bent at the boundary between the cell and the solution so as to emerge substantially parallel to the axis 7. On encountering cover 3 it is not refracted as it enters it at a zero angle of incidence. Lens system 11 directs the substantially parallel rays that have passed through the cells onto the cathode 12 of a photoelectric cell 13. The lens system 11 may be omitted with entirely satisfactory results if the rays impinging on the bottom of the slide from light source 5 are not too divergent. Oblique light source 5 is positioned at such an angle in relation to lens system 11 that the latter does not intercept the group of light rays that have not been refracted by the blood cells.

Greater accuracy is obtained in blood counts by measuring the light refracted by the cells than by measuring the interference of the cells to a direct source of light, because when oblique light is used the color of the cells or the color of the solution in which the cells are suspended will not effect a substantial error as would be the case in an ordinary densimeter or colorimeter.

In making a red blood cell count, it is customary to consider the number of white cells as negligible, the ratio in normal blood being approximately 40 to 1. Therefore, in using the apparatus of this invention, a solution of blood containing both red and white cells is inserted in the space 42 between area 4 or 4' and cover 3 of the slide 1 and the reading of the meter 14, although indicative of the light refracted by both red and white cells is according to the customary practice noted above a proper measure of the number of red cells.

In order to make a white blood cell count, a second sample of blood is treated with a solution of hydrochloric acid or cetyl pyridinium chloride or other substance that produces hemolysis and inserted in space 42. Cetyl pyridinium chloride has been found very advantageous for use with the apparatus because it not only frees the hemoglobin from the red cells, but it also dissolves their cell walls so that the only dense bodies left in the solution are the white cells and, therefore, the amount of refracted light is an accurate measure of their number.

A determination of the hemoglobin percentage is made from the same specimen used to obtain a white cell count. The break down of the red cells frees their hemoglobin content and forms a brown solution, the density of which is indicative of the percentage of hemoglobin contained in the red cells. A separate source of light 16 is located on the axis and the amount of this light that gets through the slide is measured by the photoelectric cell. Again the interference of the white cells is considered negligible. This determination is not dependent on refracted light, and, therefore, light 5 is turned off during this part of the test.

The photoelectric cell 13, as shown in Figure 2, is connected in series with a high impedance tube 17 between a source of D. C. potential 18 and ground. When no light impinges on its cathode 22 its resistance is high and therefore the voltage at the plate 19 of tube 17 will be low. As this voltage is applied to the grid of power amplifier tube 21 very little current flows through the microammeter 14 in its plate circuit. Upon activation of the cathode of the photoelectric tube by light from source 5 or light source 16, the D. C. potential applied to grid 20 of tube 21 is increased and the microammeter needle is deflected by an amount proportional to the total number of lumens of light falling on cathode 22. The cathodes 24 and 25 of tubes 17 and 21 respectively are connected in series with resistors 26, 27 and 28 which determine their D. C. potential above ground and resistor 27 determines the bias of grid 29 of tube 17. The grid bias of grid 30 of tube 17 is varied by adjustment of potentiometer 32. The selection of light source is carried out by ganged switch 33 and the percentage of available voltage that is applied to each light separately is determined by the value of resistors 34 and 35 connected to the negative terminal of the lights 5 and 16 respectively. Rheostat control 36 adjusts the amount of available voltage supplied by battery 18 and light 40 indicates when the circuit is energized.

The current drain of the entire circuit including the tube filaments and light sources is exceedingly low resulting in a minimum current drain on the battery which results in longer battery life.

Although the battery power supply has been found most satisfactory due to stability, the current may also be supplied from standard 110 A. C. volts if the voltage is reduced, rectified, and stabilized in regard to variations in frequency and voltage.

Several critical factors are now discussed.

It is necessary to use the same amount of blood for every test or the meter readings are meaningless. Slide 1, shown in Figure 3, is composed of a flat plate having two raised parallel ridges 3' and 3². The two intermediate areas 4 and 4' are precisely equal, and are .019685 inch below the tops of the ridges. When a cover 3 is placed firmly on the ridges, as shown in Figure 1, the space 42 between it and the areas 4 and 4' is sufficiently thin to have capillary attraction for the blood dilutions. To fill the space, the pipette in which the blood dilution is prepared is held adjacent to the edge of the space 42 and emptied. The blood dilution is restricted to areas 4 and 4' by the capillary attraction and, therefore, the volume of blood on every area and every slide is constant.

Other requirements are that the relationship between the space 42 and the dilution be such that substantially less than one complete layer of cells is formed in the space 42 because when one complete layer is formed covering the whole of area 4 or 4' all the light from source 5 is refracted to the photoelectric tube and the presence of more blood cells would be meaningless. The presence of more blood cells under such a situation might even cause a diminution in the amount of light that reaches the photoelectric tube due to the light energy lost in passing through the additional blood cells and to the light that might escape the lens system due to double refraction produced in passing through more than one blood cell. It has been found that a dilution of 1 part of blood to 400 parts of solution is necessary to achieve this result in the space having the thickness described above when taking a red cell count and that 1 part blood to 10 parts of solution is satisfactory for a white cell count. Of course, these ratios can be changed to a degree limited by the dimension of space 42. These ratios of blood to the diluting liquid also make it possible to make both the red and white blood cell counts on the same scale of meter 14 without adjusting the amount of light issuing from oblique source 5. They also allow the amplifier 44 to be set well within its stable range in order to obtain sufficiently large swings of the microammeter needle when a white cell count is made.

Resistor 34 is adjusted so that with the full amount of illumination of light 16 on the photoelectric tube the microammeter gives a full scale reading. Light 5 is allowed to burn at full brilliance because there is no danger that a specimen using the dilutions mentioned above will ever refract sufficient light to give more than a full scale deflection of the meter, and when no specimen is on the slide, no light reaches the photoelectric tube from this oblique source.

This apparatus is calibrated by introducing specimens of red and white corpuscles whose number has been previously determined by visual counts made under the conventional microscope by standard accepted methods. The significance of the scale reading is determined once and for all with these known specimens. When these calibrations have been established it is not necessary to recalibrate this instrument as it is in the case with other devices.

To compensate for loss in battery voltage to the photoelectric tube amplifier and the light sources, the selector switch 33 is positioned so that light source 16 is illuminated. A counting chamber without any blood specimen on it is introduced between the lens system and the direct light and battery voltage control rheostat 36 is adjusted until the meter needle reads full scale.

A general assembly of the apparatus of this invention is illustrated in Figure 5 wherein battery 18 is securely mounted in the lowest compartment 47, switches 33 and 36 are immediately available at the right hand side of the cabinet, pilot light 40 in the front of the cabinet shows when the power is turned on, and light sources 5 and 16 are mounted in the lowest compartment 47. The middle compartment 48 on top of the rear half of the compartment 47 is a support for the upper compartment 50 in which are located the amplifier 44, the microammeter 14 and a photoelectric tube 13, the center of which is in axis 7. The lens system 11 is supported by tube 51 with its axis coinciding with the axis 7 in such adjustable manner in collar 52 that the full amount of light passing therethrough can be made to exactly coincide with the cathode surface of the photoelectric tube.

Light shield 51' curves around objective tube 51 and is in no way connected with it. Light shield 51' is fastened to upper compartment 50 and middle compartment 48. The purpose of this light shield is to protect the lens system 11 from mishandling and protect the counting chamber from extraneous light which may effect the accuracy of the reading of the instrument. Slide 1, as shown in Figure 5 is mounted over aperture 53 in the top of the lower compartment 47 in such manner that the center of surface 4 or surface 4' depending on whether a red cell or white cell count is being made is in the axis 7. Light source 16 is, of course, centered on the axis 7.

This invention advances the art of blood analysis, although it is not restricted to this use, by making it unnecessary for a laboratory technician to tediously count the number of blood cells with a microscope, and providing a quicker, accurate way of automatically obtaining this information as well as the hemoglobin percentage.

I claim:

1. Apparatus for determining blood cell counts in a layer of blood solution, comprising a slide-supporting platform, light measuring means including a photoelectric cell supported on one side of said platform substantially on the effective central normal axis thereof, a light source on the other side of said platform offset from said effective central normal axis and disposed to project a beam of parallel light through said platform at an oblique angle thereto which angle is less than the critical angle of the solution, a second light source on said other side of said platform substantially on the effective central normal axis thereof and disposed to project a beam of light along said axis and a selector switch to energize said light sources alternately.

2. Apparatus according to claim 1, including an optical lens system between said platform and said photoelectric cell for concentrating all light passing through said platform in a direction normal thereto onto said cell.

ERNEST LEE ROWLAND, JR.

REFERENCES CITED

The following references are of record in the file of this patent:

UNITED STATES PATENTS

| Number | Name | Date |
| --- | --- | --- |
| 198,782 | Tolles | Jan. 1, 1878 |
| 1,943,278 | Thompson et al. | Jan. 9, 1934 |
| 1,978,096 | White | Oct. 23, 1934 |
| 2,042,281 | Traver | May 26, 1936 |
| 2,051,320 | States | Aug. 18, 1936 |
| 2,369,577 | Kielland | Feb. 13, 1945 |
| 2,419,914 | Pamphilon | Apr. 29, 1947 |
| 2,480,312 | Wolf | Aug. 30, 1949 |

OTHER REFERENCES

Beck-Text—The Microscope (1st ed.), 1921, R. & J. Beck Ltd., Cornhill, London, pages 58, 59 and 61. Copy in Division 7.